United States Patent [19]

Houlihan

[11] Patent Number: 5,260,915
[45] Date of Patent: Nov. 9, 1993

[54] WRISTWATCH RADIOTELEPHONE

[75] Inventor: John T. Houlihan, Southbury, Conn.

[73] Assignee: Timex Corporation, Middlebury, Conn.

[21] Appl. No.: 963,411

[22] Filed: Oct. 16, 1992

[51] Int. Cl.$^5$ .......................... G04B 47/00; A44C 5/00
[52] U.S. Cl. ........................................ 368/10; 368/13; 368/282; 224/165; 379/90; 379/428
[58] Field of Search ................ 368/10, 276, 277, 278, 368/281–282; 63/1 R, 3, 9, 21; 24/265 WS; 224/164, 165, 174; 59/79.1, 80; 319/90, 428, 430

[56] References Cited

U.S. PATENT DOCUMENTS

| 704,243 | 7/1902 | Davis | 63/9 |
|---|---|---|---|
| 2,120,348 | 6/1938 | Bezault | 63/9 |
| 2,649,230 | 8/1953 | Thompson | 368/282 |
| 3,032,651 | 5/1962 | Gisiger-Stahl et al. | 250/14 |
| 3,940,038 | 2/1976 | Claude | 224/164 |
| 4,162,754 | 7/1979 | Fleming | 224/165 |
| 4,847,818 | 7/1989 | Olsen | 368/10 |
| 5,008,864 | 4/1991 | Yoshitake | 368/10 |

FOREIGN PATENT DOCUMENTS 289148 3/1951 Switzerland ............... 63/9

Primary Examiner—Vit W. Miska
Attorney, Agent, or Firm—Robert R. Jackson; G. Victor Treyz

[57] ABSTRACT

A combined wristwatch and radiotelephone has a plurality of substantially rigid segment members arranged end to end in a series with pivotable connections between each adjacent pair of members in the series. The pivotal axes of these connections are substantially parallel to the longitudinal axis of the user's wrist when the apparatus is worn on the wrist as a wristwatch. The pivotable connections allow the apparatus to be curved into a shape which fits around the user's wrist when the apparatus is to be used as a wristwatch. Alternatively, the pivotable connections allow the apparatus to form a more elongated structure suitable for use as a hand-held radiotelephone when such use is desired.

17 Claims, 3 Drawing Sheets

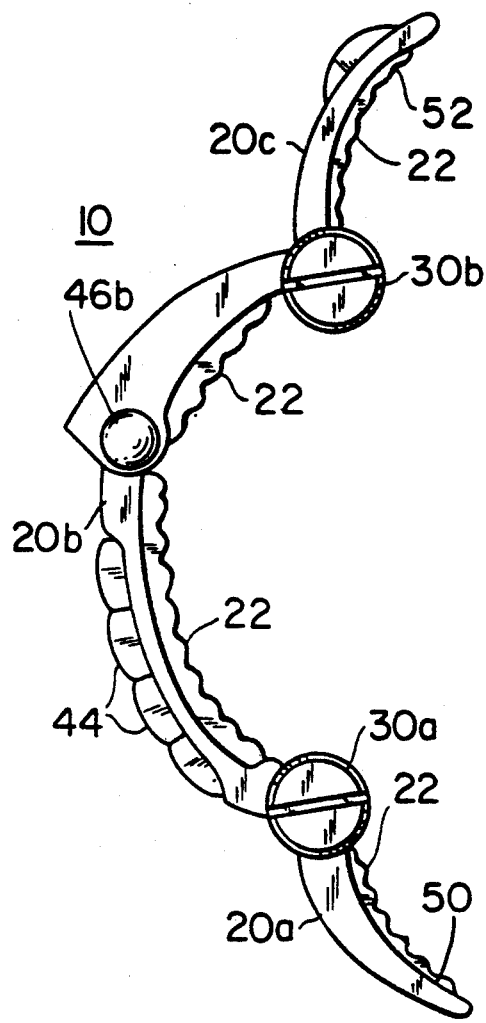
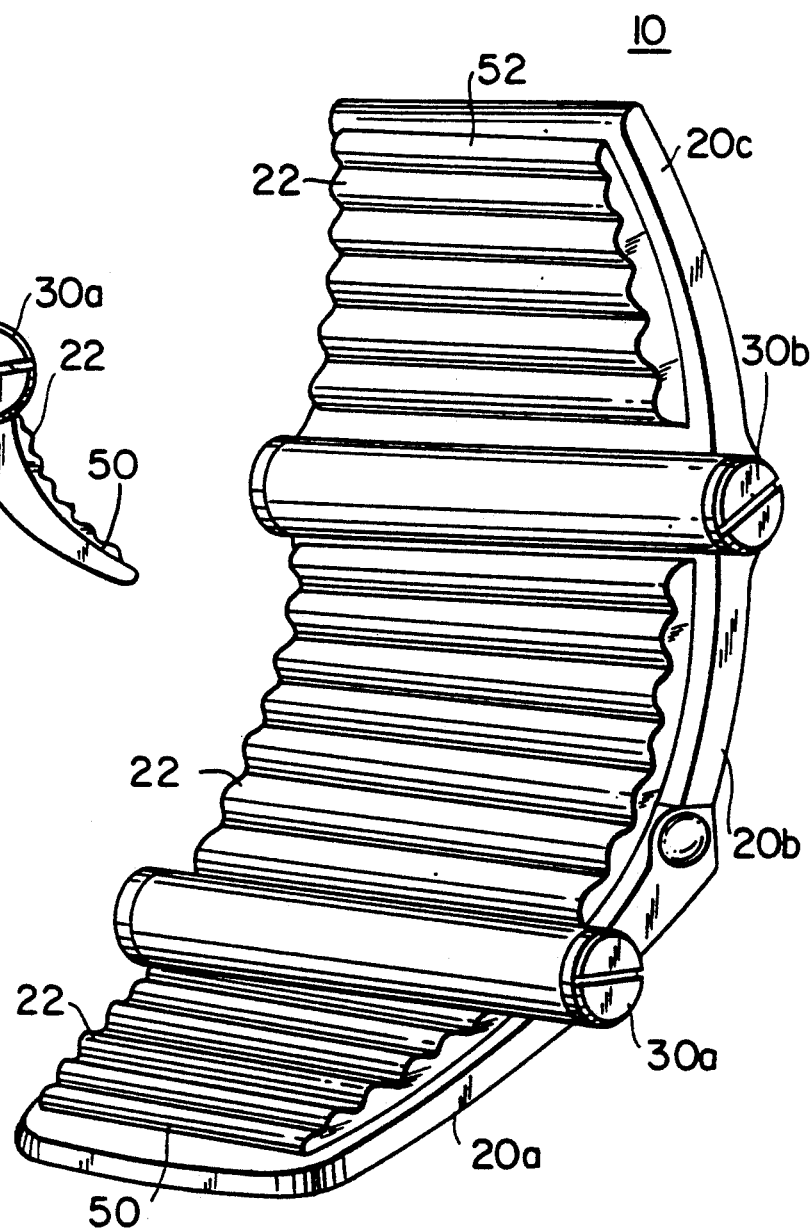

WRISTWATCH RADIOTELEPHONE

BACKGROUND OF THE INVENTION

This invention relates to a combined wristwatch and radiotelephone, and more particularly to a wristwatch which can be converted temporarily to a form suitable for use as a hand-held radiotelephone.

Olsen U.S. Pat. No. 4,847,818 shows a wristwatch which can be removed from the user's wrist and temporarily reconfigured for use as a hand-held radiotelephone. The Olsen apparatus has many desirable features, but it would also be desirable to have a structure which forms a somewhat more definite, predetermined shape when reconfigured as a radiotelephone. This would tend to give the article a more substantial "feel" when used as a radiotelephone, thereby making the article more acceptable and attractive to at least some users.

In view of the foregoing, it is an object of this invention to provide a wristwatch radiotelephone which can be made to positively assume a definite shape of a first kind when configured for use as a wristwatch, and which can similarly be made to positively assume a definite shape of a second kind when configured for use as a radiotelephone.

SUMMARY OF THE INVENTION

This and other objects of the invention are accomplished in accordance with the principles of the invention by providing a wristwatch radiotelephone which includes a plurality of rigid or substantially rigid segment members connected together in a series by pivotable connections between adjacent segment members in the series. The pivotable connections allow the segment members to be disposed relative to one another either in a curved configuration which fits on the wrist when the apparatus is to be worn as a wristwatch, or in a more elongated configuration when the apparatus is to be used as a radiotelephone.

Further features of the invention, its nature and various advantages will be more apparent from the accompanying drawings and the following detailed description of the preferred embodiments.

BRIEF DESCRIPTION OF THE DRAWINGS

FIG. 3 is a view similar to FIG. 2 showing the apparatus opened out to the radiotelephone configuration.

FIG. 4 is a perspective view of the apparatus of FIG. 3.

DETAILED DESCRIPTION OF THE PREFERRED EMBODIMENTS

Olsen U.S. Pat. No. 4,847,818, which is hereby incorporated by reference herein, shows all the electronic components and circuitry needed for a wristwatch radiotelephone. All of those same components and circuitry can be used in a wristwatch radiotelephone constructed in accordance with the present invention. Accordingly, it will not be necessary to repeat here any of the details regarding that portion of the apparatus.

Figure 1:
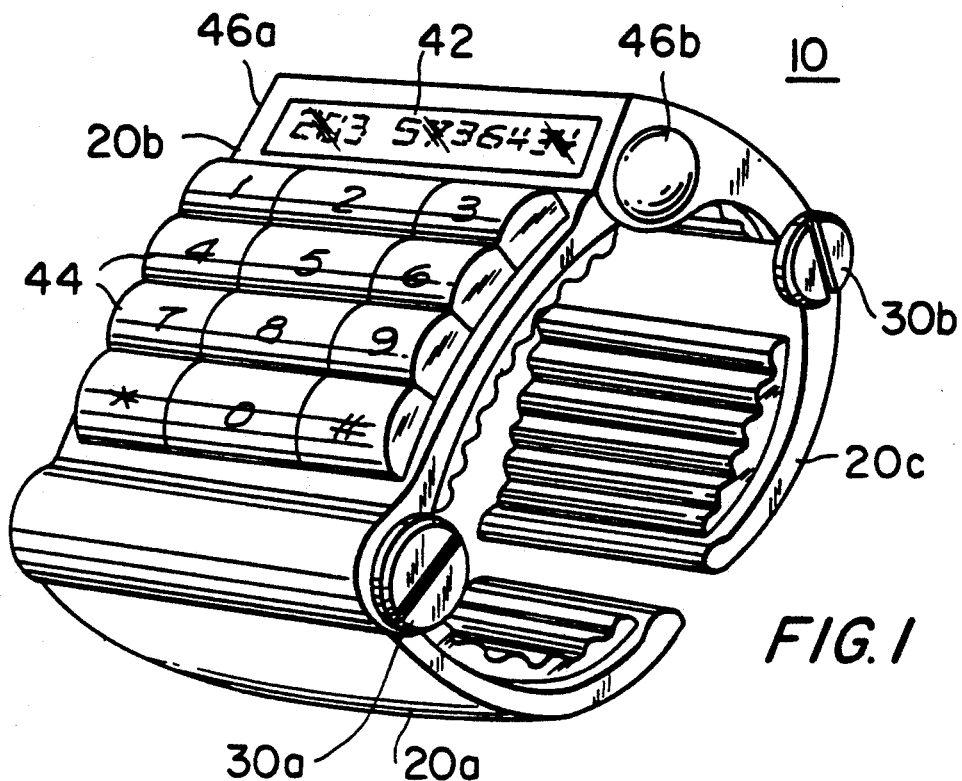
FIG. 1 is a perspective view of an illustrative embodiment of a wristwatch radiotelephone constructed in accordance with this invention in the wristwatch configuration.
Figure 2:
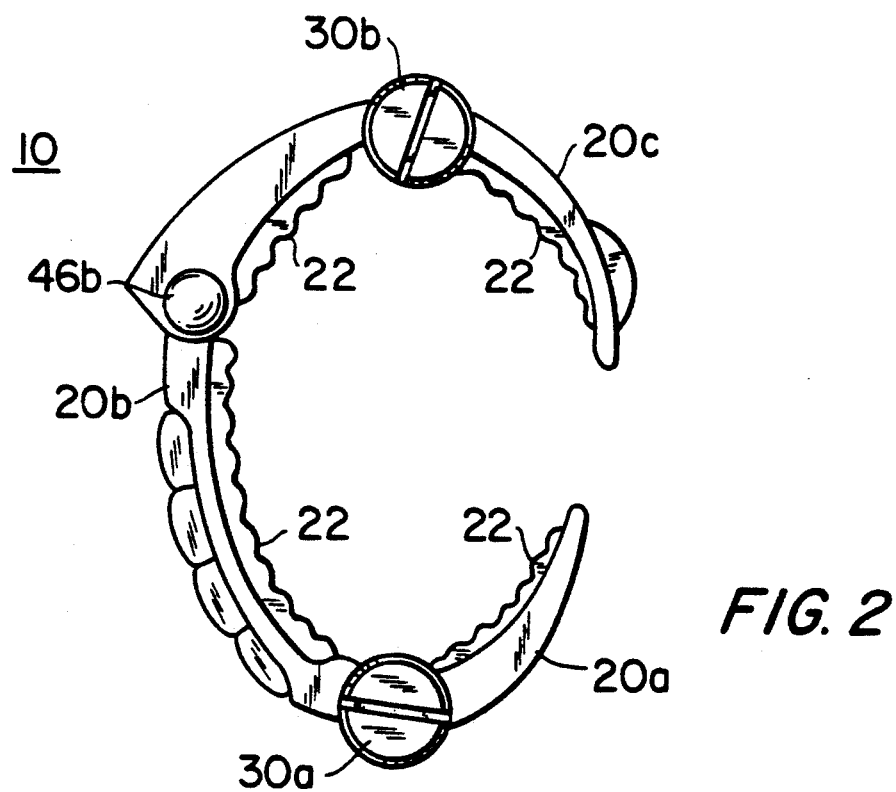
FIG. 2 is an elevational view of the apparatus of FIG. 1.

As shown in FIGS. 1 and 2 an illustrative embodiment of the wristwatch radiotelephone 10 of this invention includes three substantially rigid segment members 20a, 20b, and 20c. These three segment members are connected together in a series by pivotable connection mechanisms 30a and 30b. In particular, pivotable connection mechanism 30a pivotably connects one end of segment member 20a to the adjacent end of segment member 20b. Pivotable connection mechanism 30b pivotably connects one end of segment member 20c to the adjacent end of segment member 20b. Pivotable connection mechanisms 30a and 30b are at respective opposite ends of segment member 20b.

Segment members 20 are all curved in the same direction. Accordingly, when segment members 20a and 20c are pivoted relative to segment member 20b to the positions shown in FIGS. 1 and 2, apparatus 10 forms a nearly closed C shape which fits comfortably around a human wrist. The apparatus can then be worn on the wrist as a wristwatch. It will be noted that the pivotal axes of connection mechanisms 30 are substantially parallel to the longitudinal axis of the wrist when the apparatus is worn as a wristwatch.

Segment member 20b includes a display 42 which can be used to display the time, a telephone number, and/or other message information. Segment member 20b also includes telephone dialing push buttons 44 (e.g., for allowing the user to enter a telephone number to be called when the apparatus is used as a radiotelephone) and additional push buttons 46a and 46b for controlling the timekeeping and radiotelephone functions of the apparatus. Elements 42, 44, and 46 are respectively similar to elements 10, 12, and 11 in the above-mentioned Olsen patent.

As is discussed in more detail below, each of pivotable connection mechanisms 30 may include a spring for resiliently urging segment members 20a and 20c to pivot relative to segment member 20b into the C-shaped wristwatch configuration shown in FIGS. 1 and 2. This helps hold the apparatus snugly on the wrist and allows the apparatus to accommodate wrists of various sizes. Each pivotable connection mechanism 30 may also have a stop to prevent segment members 20a and 20c from pivoting unduly far in toward segment member 20b. These stops are preferably positioned to allow the above-mentioned springs to be effective to urge segment members 20a and 20c inwardly against the smallest wrist for which the apparatus is designed, but to prevent segment members 20a and 20c from pivoting in substantially farther than that. The inner surfaces of segment members 20 are preferably lined with soft padding 22 to cushion the apparatus on the wrist.

When it is desired to use the apparatus as a radiotelephone, pivotable connections 30 allow each of segment members 20a and 20c to be pivoted at least about 90° out from segment member 20b and away from one another so that the apparatus takes on the more elongated configuration shown in FIGS. 3 and 4. In the preferred embodiments each of connection mechanisms 30 preferably includes a detent for releasably holding the associated segment member 20a or 20c in this outwardly pivoted position. Accordingly, once segment members 20a and 20c have been pivoted out as shown in FIGS. 3 and 4, they tend to remain in those positions until the detents are deliberately manually overcome in order to pivot members 20a and 20c back in toward one another and toward segment member 20b.

A radiotelephone microphone 50 is located near the free end of segment member 20a, and a radiotelephone speaker 52 is similarly located near the free end of segment member 20c. When segment members 20a and 20c are pivoted out to the positions shown in FIGS. 3 and 4, the spacing between elements 50 and 52 is such that microphone 50 will be adjacent the user's mouth and speaker 52 will be simultaneously adjacent the user's ear when the apparatus is held in the hand along one side of the user's face. Accordingly, the apparatus is suitable for convenient use as a hand-held radiotelephone. Because in the depicted preferred embodiment both of elements 50 and 52 are located under padding 22, that padding is preferably acoustically substantially transparent, at least in the vicinity of elements 50 and 52. Elements 50 and 52 are respectively similar to elements 6 and 8 in the above-mentioned Olsen patent.

Figure 5:
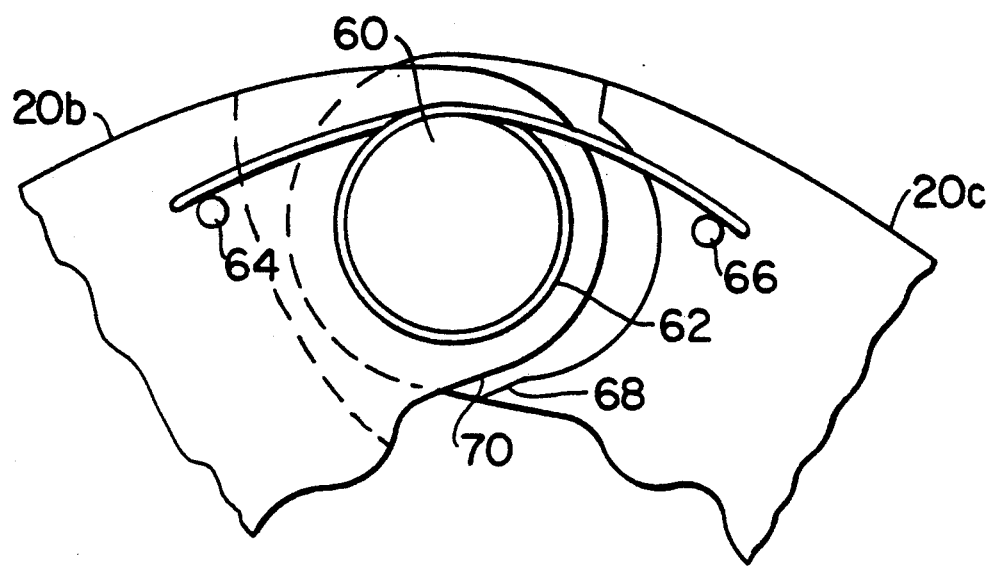
FIG. 5 is a schematic diagram showing how a portion of the apparatus of FIGS. 1-4 can be constructed.
Figure 6:
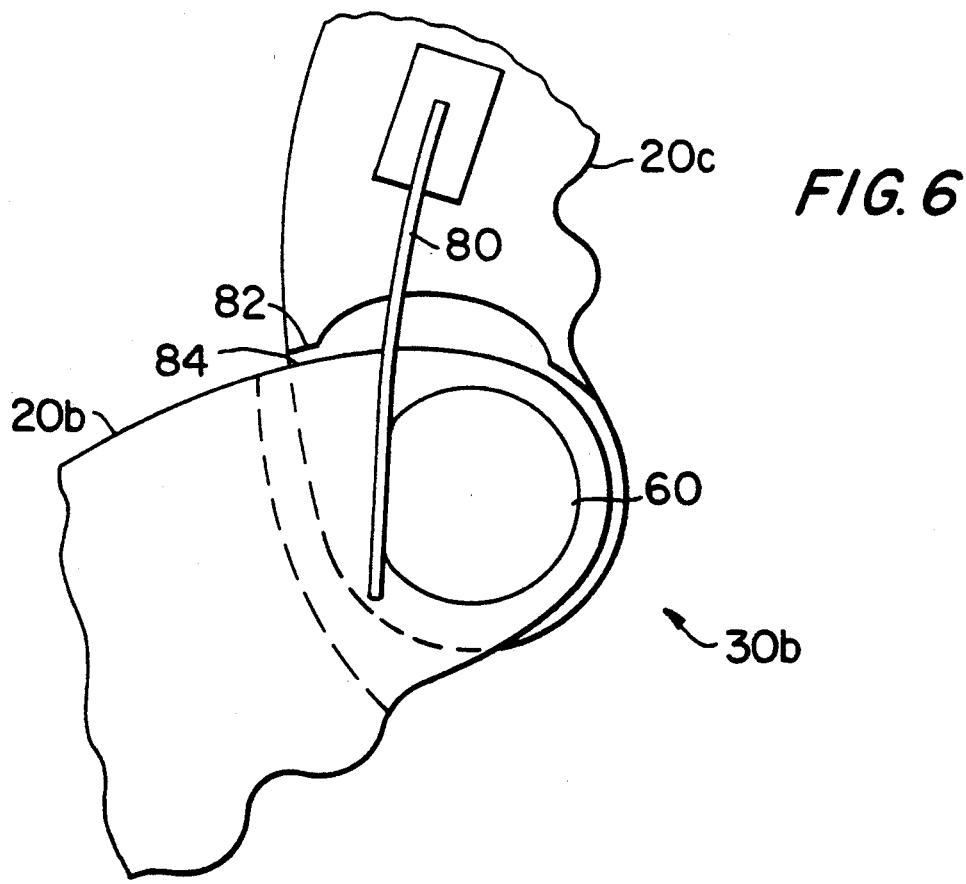
FIG. 6 is another schematic diagram showing how a portion of the apparatus of FIGS. 1-4 can be constructed.

Although pivotable connection mechanisms 30 can alternatively be constructed in many other ways, FIGS. 5 and 6 illustrate one possible construction of typical connection mechanism 30b. As noted above, FIGS. 5 and 6 are largely schematic and do not necessarily show the actual locations of various components along the pivotal axis of the depicted pivotable connection. Moreover, FIGS. 5 and 6 depict components which are typically disposed at different locations along the pivotal axis. FIG. 5 shows the apparatus in the wristwatch configuration, while FIG. 6 shows the apparatus in the radiotelephone configuration.

As shown in FIGS. 5 and 6, segment member 20c pivots relative to segment member 20b about an axle 60 which is fixedly mounted in the adjacent end of member 20b. A prestressed coil spring 62 is disposed around axle 60 and has outwardly extending ends which bear on stops 64 and 66 in segment members 20b and 20c, respectively. Spring 62 is prestressed and cooperates with stops 64 and 66 to resiliently urge segment member 20c to pivot in toward segment member 20b about axle 60 to the position shown in FIGS. 1, 2, and 5. Contact between surface 68 on segment member 20c and surface 70 on segment member 20b stops this pivotal motion at a size just smaller than the smallest wrist size for which the apparatus is designed to be used.

A detent mechanism associated with pivotable connection mechanism 30b is shown in FIG. 6. This detent mechanism includes leaf spring 80 mounted in segment member 20c so that it bears on the perimeter of axle 60. Throughout most of the range of pivotal motion of segment member 20c relative to segment member 20b, leaf spring 80 contacts a cylinder-shaped portion of the surface of axle 60. However, when segment member 20c is fully pivoted out from segment member 20b, leaf spring 80 drops into a recessed portion of the surface of axle 60 as shown in FIG. 6. Leaf spring 80 then acts as a detent to releasably resist pivoting of segment member 20c back toward segment member 20b. The detent thus provided by spring 80 is strong enough to resist the pivoting force of spring 62. However, this detent can be easily overcome manually when it is desired to return the apparatus to the wristwatch configuration. Outward pivoting of segment member 20c relative to segment member 20b is stopped just beyond the detent position by contact between surface 82 on segment member 20c and surface 84 on segment member 20b.

It will be noted that pivotable connection mechanisms including features somewhat like those described herein are also shown in commonly assigned, concurrently filed, applications Ser. No. 07/961,656 and Ser. No. 07/962,355, both of which are hereby incorporated by reference herein.

It will be understood that the foregoing is merely illustrative of the principles of this invention, and that various modifications can be made by those skilled in the art without departing from the scope and spirit of the invention. For example, although the depicted embodiment includes three pivotally connected segment members, any number of pivotally connected segment members can be used. Similarly, the locations of elements such as 42, 44, 46, 50, and 52 can be varied as desired. The amount by which adjacent segment members can be pivoted relative to one another about the pivotable connection joining them can also be varied as desired. As still another example of a modification within the scope of this invention, the ends of segment members 20a and 20c, which are shown as free in the depicted embodiment, can alternatively be releasably connected to one another by a releasable link, clasp, or other similar component so that the apparatus is annular rather than C-shaped in the wristwatch configuration.

The invention claimed is:

1. Apparatus which is convertible between a curved shape suitable for wearing around the wrist as a wristwatch and an elongated form suitable for use as a handheld radiotelephone with a microphone and speaker adjacent respective opposite ends of said elongated form comprising:
   a plurality of substantially rigid segment members disposed end to end in a series;
   a plurality of pivotable connection mechanisms, each of said connection mechanisms pivotally connecting the adjacent ends of an adjacent pair of said segment members in said series, each of said connection mechanisms having a pivotal axis, all of said pivotal axes being substantially parallel to one another and to the longitudinal axis of the wrist around which said apparatus is worn as a wristwatch; and
   second means for releasably holding said apparatus in said elongated form, so that said microphone and said speaker may be simultaneously placed adjacent to a user's mouth and ear, respectively.

2. The apparatus defined in claim 1 further comprising first means for releasably holding said apparatus in said curved shaped.

3. The apparatus defined in claim 2 wherein said first means comprises spring means for resiliently urging each of said connection mechanisms to pivot the segment members connected by said connection mechanism toward one another.

4. The apparatus defined in claim 3 wherein each of said connection mechanisms comprises stop means for preventing the segment members connected by said connection mechanism from pivoting toward one another by more than a predetermined amount.

5. The apparatus defined in claim 1 wherein said second means comprises detent means associated with each of said connection mechanisms for releasably holding the segment members connected by said connection mechanism in the relative positions in which said segment members are pivoted away from one another.

6. The apparatus defined in claim 1 further comprising stop means associated with each of said connection mechanisms for limiting the amount by which the segment members connected by said connection mechanism can pivot relative to one another about the pivotal axis of said connection mechanism.

7. The apparatus defined in claim 6 wherein each of said stop means limits pivoting of the segment members connected by the associated connection mechanism to approximately 90°.

8. The apparatus defined in claim 1 wherein said microphone is disposed in a first segment member which is at one end of said series, and wherein said speaker is disposed in a second segment member which is at the end of said series remote from said first segment member.

9. The apparatus defined in claim 1 further comprising:
- display means disposed in one of said segment members;
- telephone dialing means disposed in one of said segment members; and
- timekeeping control means disposed in one of said segment members.

10. The apparatus defined in claim 9 wherein said display means, said telephone dialing means, and said timekeeping control means, are all disposed in a first of said segment members.

11. The apparatus defined in claim 10 wherein said first segment member is an intermediate segment member in said series.

12. The apparatus defined in claim 11 wherein said microphone is disposed in a second segment member adjacent one end of said first segment member, and wherein said speaker is disposed in a third segment member adjacent the end of said first segment member which is remote from said second segment member.

13. The apparatus defined in claim 1 wherein each of said segment members is curved, and wherein all of said segment members curve in the same direction when said apparatus is in said curved shape.

14. The apparatus defined in claim 1 wherein said curved shaped is C-shaped.

15. The apparatus defined in claim 1 further comprising:
- padding means on the surface of each of said segment members which is in contact with the wrist when said apparatus is worn on the wrist.

16. The apparatus defined in claim 1 wherein said microphone and said speaker are both directed inwardly toward the center of the curved shape when said apparatus is in said curved shape.

17. The apparatus defined in claim 16 further comprising:
- acoustically transparent padding means covering said microphone and speaker means.

* * * * *